US012670010B2

(12) United States Patent
Albini et al.

(10) Patent No.: US 12,670,010 B2
(45) Date of Patent: Jun. 30, 2026

(54) SYSTEM AND METHOD FOR COMPUTING CLUSTERED EXPLANATION WITH SPECIAL OR LIMITED VALUES

(71) Applicant: JPMorgan Chase Bank, N.A., New York, NY (US)

(72) Inventors: Emanuele Albini, London (GB); Sanjay Kariyappa, Mountain View, CA (US); Leonidas Tsepenekas, College Park, MD (US); Mikhail Solonin, London (GB); Freddy Lecue, Mamaroneck, NY (US); Daniele Magazzeni, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 510 days.

(21) Appl. No.: 18/371,305

(22) Filed: Sep. 21, 2023

(65) Prior Publication Data
US 2025/0068447 A1      Feb. 27, 2025

(30) Foreign Application Priority Data
Aug. 25, 2023     (GR) .............................. 20230100694

(51) Int. Cl.
*G06F 9/455*            (2018.01)

(52) U.S. Cl.
CPC .................... *G06F 9/45558* (2013.01); *G06F 2009/45562* (2013.01); *G06F 2009/4557* (2013.01)

(58) Field of Classification Search
CPC ....... G06F 9/45558; G06F 2009/45562; G06F 2009/4557
See application file for complete search history.

(56) References Cited

U.S. PATENT DOCUMENTS

| | | | | |
|---|---|---|---|---|
| 9,600,774 | B1 * | 3/2017 | Biemueller | .............. G06N 5/04 |
| 10,467,547 | B1 * | 11/2019 | Range | ................... G06N 20/00 |
| 10,585,775 | B2 * | 3/2020 | Desai | ................... H04L 41/145 |
| 11,294,772 | B2 * | 4/2022 | Kumar | ............... G06F 9/45558 |
| 11,450,412 | B1 * | 9/2022 | Mohiuddin | ............ G16H 10/60 |
| 11,694,775 | B1 * | 7/2023 | Maier | ...................... G06N 7/01 |
| | | | | 705/2 |
| 2013/0197925 | A1 * | 8/2013 | Blue | ..................... G16H 40/20 |
| | | | | 705/2 |
| 2019/0087234 | A1 * | 3/2019 | Wu | ....................... G06F 3/0631 |

(Continued)

FOREIGN PATENT DOCUMENTS

WO      WO-2021170054 A1 *  9/2021   ......... G06F 9/45558

*Primary Examiner* — John B King
(74) *Attorney, Agent, or Firm* — Greenblum & Bernstein, P.L.C.

(57) ABSTRACT
A method and system for generating cluster level explanations for an input data having limited or special values are disclosed. The method includes obtaining an input data set and a clustering stopping criteria, the input data set including multiple features, and each of the features having multiple feature values; performing features decomposition on the input data; performing correlation analysis based on the features decomposition and a correlation threshold value; grouping the features having different feature values into multiple clusters; training a model based on the obtained input data; obtaining a target input data to be tested and a number of cores; grouping the number of cores into multiple clusters; and computing explanations at a cluster level.

20 Claims, 9 Drawing Sheets

(56) References Cited

U.S. PATENT DOCUMENTS

| 2022/0121465 A1* | 4/2022 | Lan | G06N 3/08 |
| 2023/0336586 A1* | 10/2023 | Sopan | H04L 63/1433 |
| 2025/0021388 A1* | 1/2025 | Agrahari | G06F 9/4881 |

* cited by examiner

Input Raw Data: R

X1 (A=0, B=1, C=8, D=9);
X2 (A=0, B=30, C=1, D=2);
X3 (A=0, B=3, C=8, D=31);
:
Xn (A=7, B=2, C=6, D=5)

Sampled Raw Data: SR i.e., R after sampling

X1 (A=0, B=1, C=8, D=9);
X2 (A=0, B=30, C=1, D=2);
X3 (A=0, B=3, C=8, D=31)

SYSTEM AND METHOD FOR COMPUTING CLUSTERED EXPLANATION WITH SPECIAL OR LIMITED VALUES

CROSS-REFERENCE TO RELATED APPLICATION

This application claims the benefit of Greek patent application Ser. No. 20230100694, filed Aug. 25, 2023, which is hereby incorporated by reference in its entirety.

TECHNICAL FIELD

This disclosure generally relates to computing clustered explanation with special or limited values. More specifically, aspects of the present disclosure is directed to processing datasets with limited or special information and generating an output for the datasets including the limited or special information.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Conventionally, computing explanations may be generated for input data having sufficient information for a decision rendered. However, for input data sets having incomplete, insufficient or special values, computing explanations may be unable to be provided questioning whether a decision rendered by the respective computer is accurate, rational, biased or the like. Special values may refer to values which could be considered as outliers, or missing such as not-a-number (NaN). Attempts to compute automated explanations in such context may be very noisy as lots of features in a computing model may be attributed similar explanations, which is not informative to its audience for distinction.

In addition, dealing with data handling special values, such as the NaN or outliers is not possible in various machine learning techniques, such as decision tree machine learning technique. This may be particularly true in the case in applications, such as credit decisioning, when the underlying machine learning models rely on data which may be highly correlated, with high number of special values (e.g., out-of-range or missing values). Credit decisioning may include various questions (e.g., why is the credit card limit increase of an applicant denied? Why a mortgage application has not been approved? Why an applicant has been denied a credit card?), for which sufficient explanations may be required to be provided along with corresponding decisions per government regulations. However, for certain data inputs, they may be unable to be computed in a conventional system for at least the reasons noted above, which may lead to question of bias, inaccuracy or the like.

SUMMARY

According to an aspect of the present disclosure, a method for generating cluster level explanations for input data having limited or special values is provided. The method includes obtaining, by a processor, an input data set and a clustering stopping criteria, the input data set including multiple data points, each of the multiple data points having multiple features, and each of the multiple features having multiple feature values; performing, by the processor, features decomposition on the input data set; grouping the multiple features values, for each of the multiple features, into multiple feature cores based on the features decomposition and the clustering stopping criteria; obtaining, by the processor, a correlation threshold value; performing, by the processor, correlation analysis of the feature cores with respect to the correlation threshold value; grouping the multiple feature cores into multiple clusters; training, by the processor, a predictive machine learning (ML) model based on the obtained input data set; obtaining, by the processor, target data to be tested and a number of feature cores for the target data, the target data having multiple features and corresponding feature values; and computing, by the processor, explanations for the target data at a feature level for each of the multiple clusters.

According to another aspect of the present disclosure, the grouping of the multiple feature cores is performed according to a number of feature cores specified for each of the multiple features.

According to another aspect of the present disclosure, each of the multiple clusters includes at least one feature core.

According to yet another aspect of the present disclosure, the method further includes obtaining, by the processor, a data distribution sampling strategy; and applying, by the processor, the data distribution sampling strategy on the input data set to remove at least one input data point from the input data set for reducing a computing load.

According to another aspect of the present disclosure, the predictive ML model is at least one of a neural network model, a decision tree model, and ensemble trees model.

According to a further aspect of the present disclosure, the computing of the explanations at the feature level for each of the multiple clusters includes: applying, by the processor, the trained predicted ML model on the obtained target data for determining a prediction score for the target data; determining, by the processor, a number of feature cores for the target data; for the prediction score of the target data, computing contribution of each of the feature cores for the target data, in which each of the feature cores for the target data contributes a portion to the prediction score of the target data; grouping the feature cores for the obtained target data into at least two clusters; and computing the explanations at a cluster level for each of the at least two clusters.

According to yet another aspect of the present disclosure, the performing of the features decomposition on the input data set includes generating a distribution chart for the input data set for the grouping of the multiple feature values into the multiple feature cores.

According to a further aspect of the present disclosure, the performing of the correlation analysis includes calculating a correlation score for each pair of the feature cores.

According to another aspect of the present disclosure, the grouping of the plurality feature cores includes grouping of each of the feature cores by comparing the correlation score against the correlation threshold value.

According to a further aspect of the present disclosure, a first feature core is grouped together to form a cluster with a second feature core when a correlation score between the first feature core and the second feature core is higher than or equal the correlation threshold value.

According to a further aspect of the present disclosure, the clustering stopping criteria is a K means clustering using an elbow method.

According to a further aspect of the present disclosure, the data distribution sampling strategy is selecting a target number of random input data points among the input data set.

According to a further aspect of the present disclosure, the data distribution sampling strategy is selecting a target number of input data points having a target feature value for a target feature among the input data set.

According to a further aspect of the present disclosure, the data distribution sampling strategy is selecting a target number of consecutive input data points among the input data set.

According to a further aspect of the present disclosure, the correlation threshold value is determined by the predictive ML model.

According to a further aspect of the present disclosure, a number of the multiple feature cores is determined by the predicted ML model.

According to a further aspect of the present disclosure, a number of the multiple feature cores is determined based on a number of counts for each of the multiple feature values.

According to a further aspect of the present disclosure, at least one of the multiple clusters includes at least two feature cores.

According to an aspect of the present disclosure, a system for generating cluster level explanations for an input data having limited or special values is provided. The system includes a memory, a display and a processor. The system is configured to perform: obtaining an input data set and a clustering stopping criteria, the input data set including multiple data points, each of the multiple data points having multiple features, and each of the multiple features having multiple feature values; performing features decomposition on the input data set; grouping the multiple features values, for each of the multiple features, into multiple feature cores based on the features decomposition and the clustering stopping criteria; obtaining a correlation threshold value; performing correlation analysis of the feature cores with respect to the correlation threshold value; grouping the multiple feature cores into multiple clusters; training a predictive machine learning (ML) model based on the obtained input data set; obtaining target data to be tested and a number of feature cores for the target data, the target data having multiple features and corresponding feature values; and computing explanations for the target data at a feature level for each of the multiple clusters.

According to another aspect of the present disclosure, a non-transitory computer readable storage medium that stores a computer program for generating cluster level explanations for an input data having limited or special values is provided. The computer program, when executed by a processor, causes a system to perform multiple processes including: obtaining an input data set and a clustering stopping criteria, the input data set including multiple data points, each of the multiple data points having multiple features, and each of the multiple features having multiple feature values; performing features decomposition on the input data set; grouping the multiple features values, for each of the multiple features, into multiple feature cores based on the features decomposition and the clustering stopping criteria; obtaining a correlation threshold value; performing correlation analysis of the feature cores with respect to the correlation threshold value; grouping the multiple feature cores into multiple clusters; training a predictive machine learning (ML) model based on the obtained input data set; obtaining target data to be tested and a number of feature cores for the target data, the target data having multiple features and corresponding feature values; and computing explanations for the target data at a feature level for each of the multiple clusters.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 8 illustrates data pre-processing based on a data distribution sampling operation in accordance with an exemplary embodiment.

DETAILED DESCRIPTION

Figure 1:
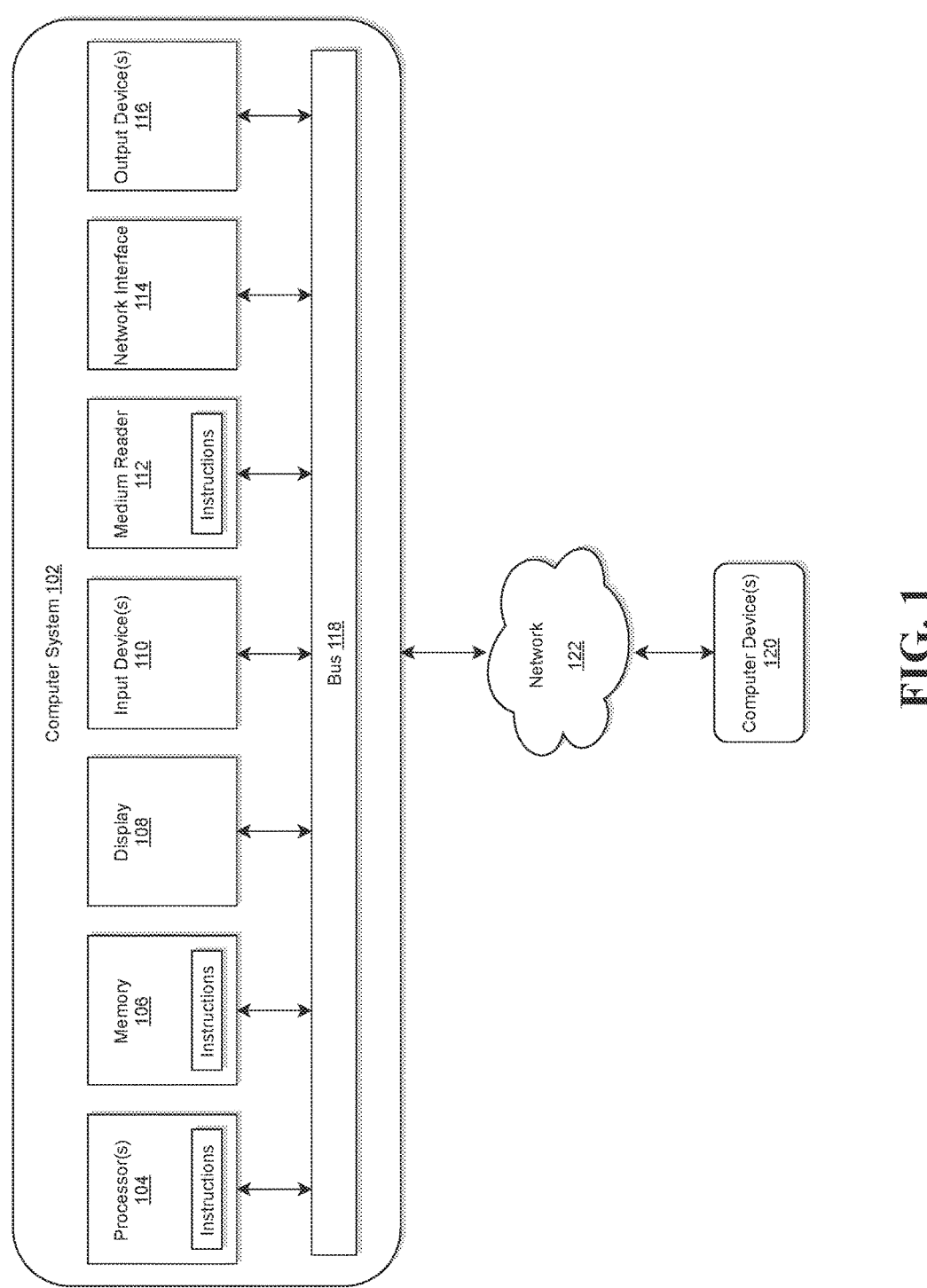
FIG. 1 illustrates a computer system for implementing a clustered explanation generating (CEG) system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a clustered explanation generating (CEG) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
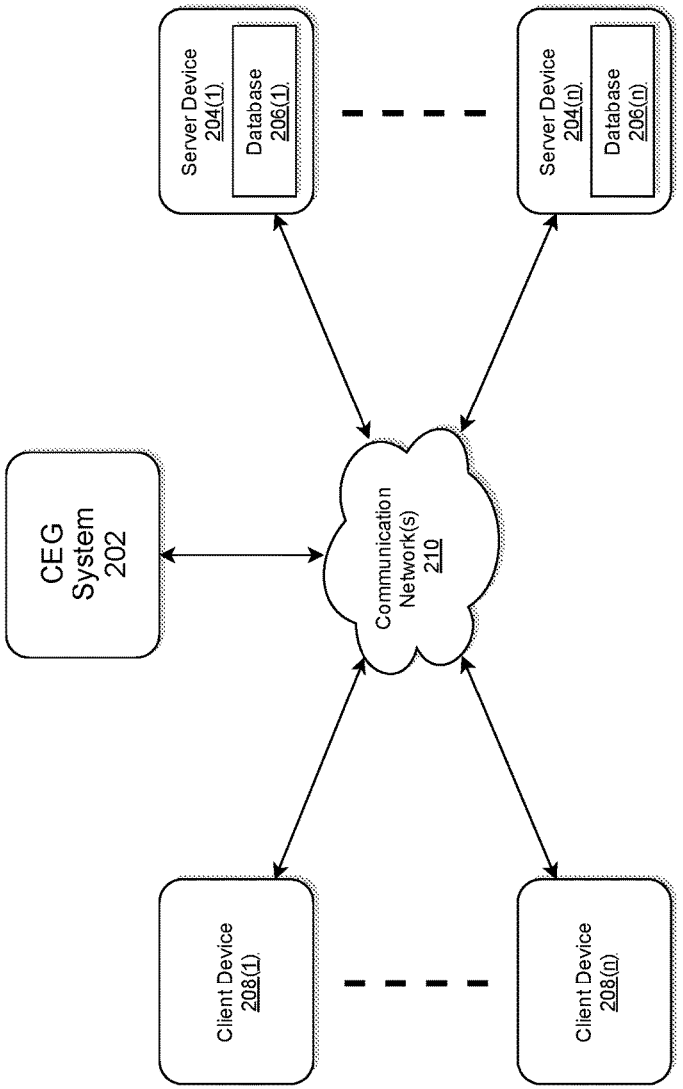
FIG. 2 illustrates an exemplary diagram of a network environment with a CEG system in accordance with an exemplary embodiment.

FIG. 2 illustrates an exemplary diagram of a network environment with a CEG system in accordance with an exemplary embodiment.

A CEG system 202 may be implemented with one or more computer systems similar to the computer system 102 as described with respect to FIG. 1.

The CEG system 202 may store one or more applications that can include executable instructions that, when executed by the CEG system 202, cause the CEG system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the CEG system 202 itself, may be located in virtual server(s) running in a cloud-based computing environment rather than being tied to one or more specific physical network computing devices. Also, the application(s) may be running in one or more virtual machines (VMs) executing on the CEG system 202. Additionally, in one or more embodiments of this technology, virtual machine(s) running on the CEG system 202 may be managed or supervised by a hypervisor.

In the network environment 200 of FIG. 2, the CEG system 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the CEG system 202, such as the network interface 114 of the computer system 102 of FIG. 1, operatively couples and communicates between the CEG system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CEG system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CEG system 202 may be a standalone device or integrated with one or more other devices or apparatuses, such as one or more of the server devices 204(1)-204(n), for example. In one particular example, the CEG system 202 may be hosted by one of the server devices 204(1)-204(n), and other arrangements are also possible. Moreover, one or more of the devices of the CEG system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the CEG system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206 (n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the CEG system 202 that may efficiently provide a platform for implementing a cloud native CEG system module, but the disclosure is not limited thereto.

The client devices 208(1)-208(n) may run interface applications, such as standard web browsers or standalone client applications, which may provide an interface to communicate with the CEG system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CEG system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CEG system 202, the server devices 204(1)-204(n), or the client devices 208(1)-208(n), for example, may be configured to operate as virtual instances on the same physical machine. For example, one or more of the CEG system 202, the server devices 204(1)-204(n), or the client devices 208(1)-208(n) may operate on the same physical device rather than as separate devices communicating through communication network(s) 210. Additionally, there may be more or fewer CEG system 202, server devices 204(1)-204(n), or client devices 208(1)-208 (n) than illustrated in FIG. 2. According to exemplary embodiments, the CEG system 202 may be configured to send code at run-time to remote server devices 204(1)-204 (n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
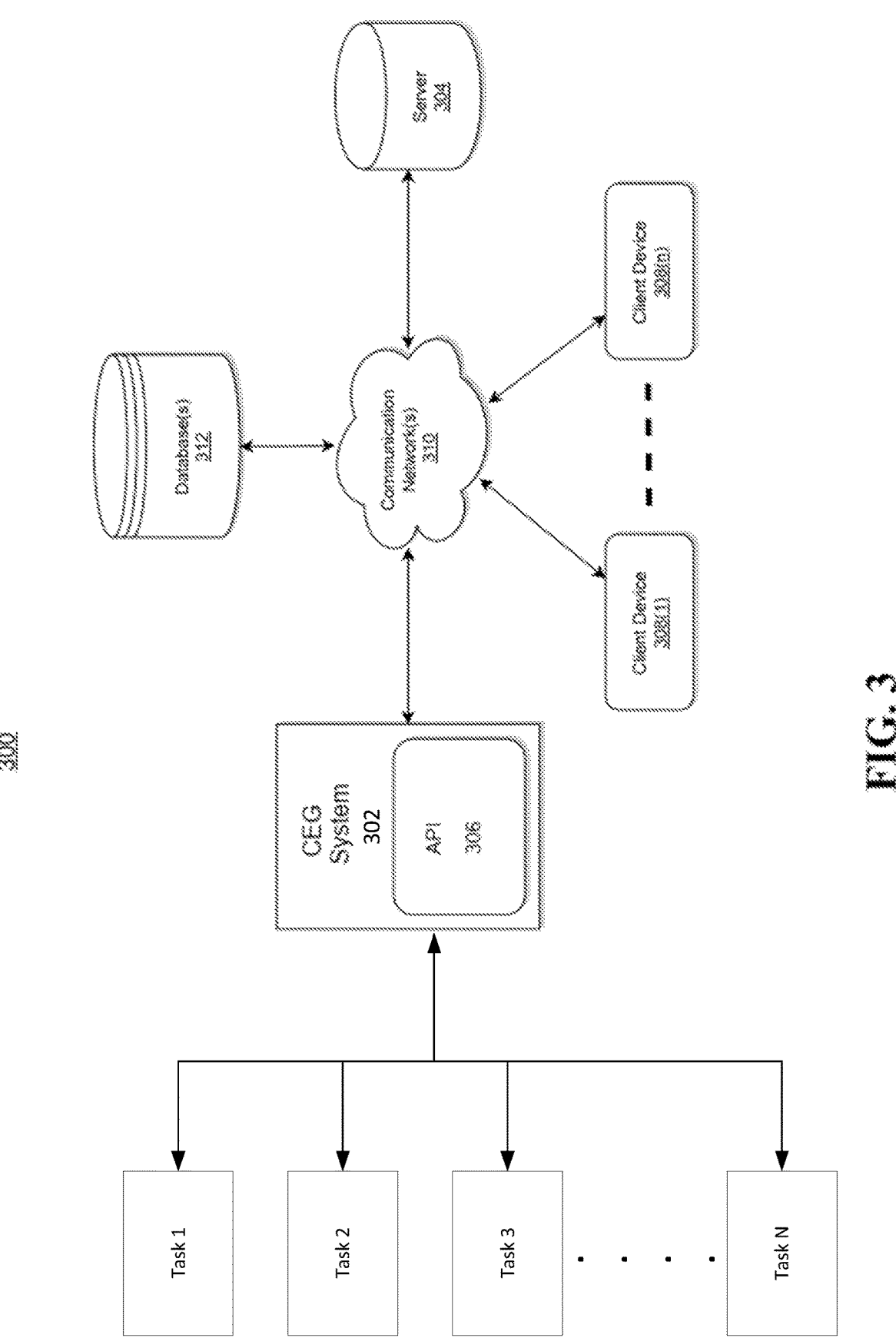
FIG. 3 illustrates a system diagram for implementing a CEG system in accordance with an exemplary embodiment.

FIG. 3 illustrates a system diagram for implementing a CEG system in accordance with an exemplary embodiment.

As illustrated in FIG. 3, the system 300 may include a CEG system 302 within which a group of API modules 306 is embedded, a server 304, a database(s) 312, a plurality of client devices 308(1) . . . 308(n), and a communication network 310.

According to exemplary embodiments, the CEG system 302 including the API modules 306 may be connected to the server 304, and the database(s) 312 via the communication network 310. Although there is only one database that has been illustrated, the disclosure is not limited thereto. Any number of databases may be utilized. The CEG system 302 may also be connected to the plurality of client devices 308(1) . . . 308(n) via the communication network 310, but the disclosure is not limited thereto.

According to exemplary embodiment, the CEG system 302 is described and shown in FIG. 3 as including the API modules 306, although it may include other rules, policies, modules, databases, or applications, for example. According to exemplary embodiments, the database(s) 312 may be embedded within the CEG system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310. Moreover, the API modules 306 may be configured to perform or compute n number of jobs or tasks (i.e., Task 1, Task 2, Task 3 up to Task N) in a distributed manner to allow computations to be more scalable.

The API modules 306 may be configured to implement a user interface (UI) platform that is configured to enable CEG system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the CEG system 302. In this regard, the plurality of client devices 308(1) . . . 308(n) may be "clients" of the CEG system 302 and are described herein as such. Nevertheless, it is to be known and understood that the plurality of client devices 308(1) . . . 308(n) need not necessarily be "clients" of the CEG system 302, or any entity described in association therewith herein. Any additional or alternative relationship may exist between either or both of the plurality of client devices 308(1) . . . 308(n) and the CEG system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the CEG system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The CEG system 302 may be the same or similar to the CEG system 202 as described with respect to FIG. 2, including any features or combination of features described with respect thereto.

Figure 4:
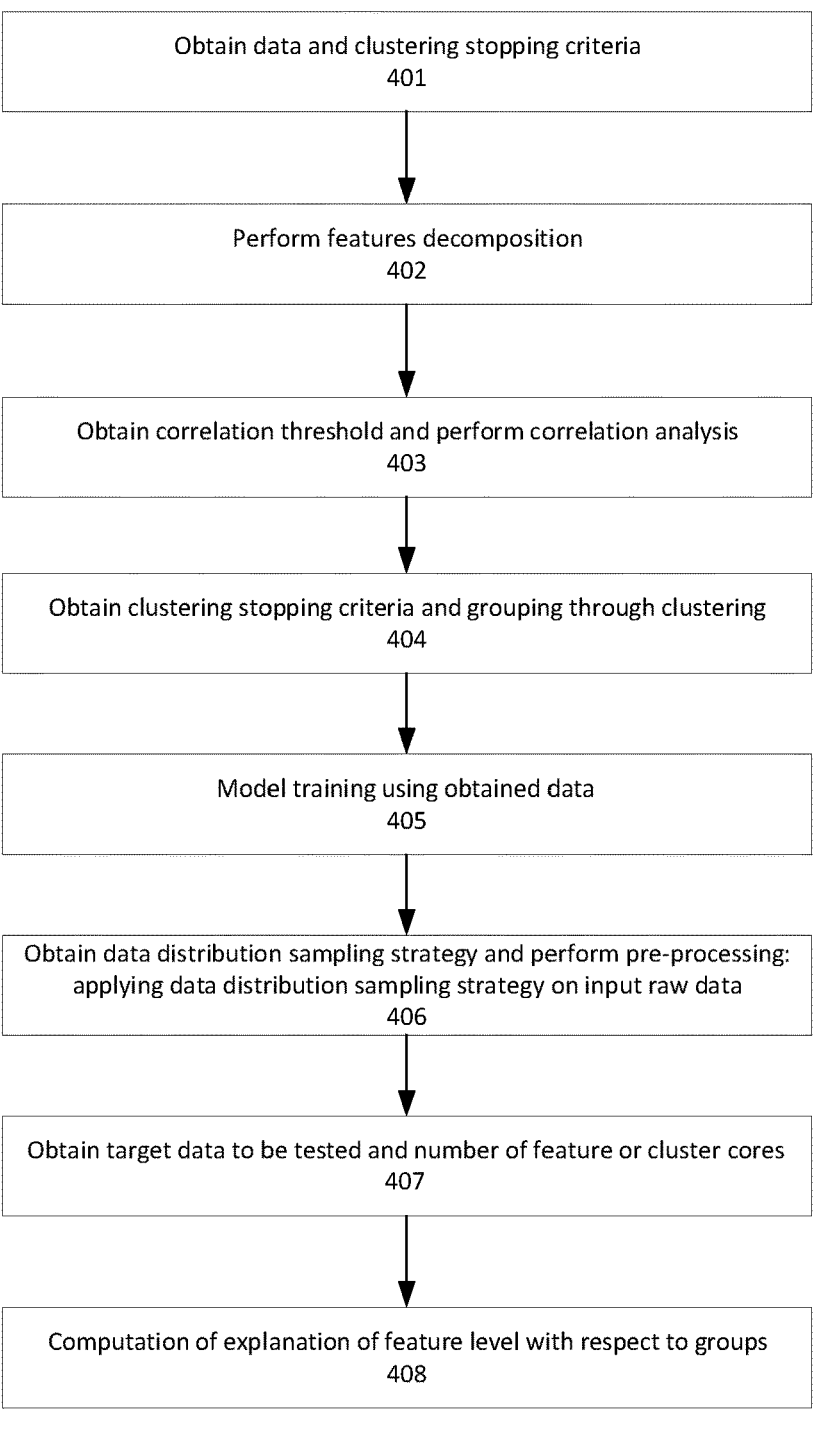
FIG. 4 illustrates a method for computing clustered explanation with special or limited values in accordance with an exemplary embodiment.

FIG. 4 illustrates a method for computing clustered explanation with special or limited values in accordance with an exemplary embodiment.

According to exemplary aspects, credit decisions and corresponding mandatory explanations may be automated using one or more machine learning models, including, without limitation, multi-layer perceptron, composition of non-linear models and the like. More specifically, aspects of the present disclosure, clusters of features including special values processed through an impact assessment via the one or more machine learning models may be utilized for providing automated explanations for a decision rendered based on input data. According to exemplary aspects, special values may refer to values that may be unique in comparison with other input data or values that are non-existing or limited in other manner.

According to exemplary aspects, a credit decisioning dataset, a machine learning model, and a sampling-based explanation technique (e.g., Shapely Additive Explanations (SHAP)) may be utilized for computing clustered explanation with special values.

According to exemplary aspects, the present disclosure may provide processes for (1) computing relevant cluster features to be used in providing an explanation, (2) computing the explanation with respect to such clusters, (3) computing the explanations given the special aspect or characteristic of data (e.g., out-of-range, missing and etc.), and (4) optimizing the computation using distributed computation on elements of clustered features.

In operation 401, raw data is obtained along with a clustering stopping criteria. In an example, raw data may include a data set including multiple data points (e.g., X data points) having one or more corresponding attributes or features (e.g., A, B, C, D and the like). Each of the attributes may indicate one or more numerical values (e.g., 0, 1, 2, 3, 4, 5 . . . 999) referred to as feature values. A combination of a feature with one or more numerical values (e.g., $A\{1, 2, 3, 4, 5\}$, $A\{0\}$ and etc.) may be referred to as a feature core or a cluster core. However, aspects of the present disclosure are not limited thereto, such that the attributes or features may indicate different values, such as text.

In an example, an input data point X may refer to a credit application of an individual applicant, and corresponding attributes or features may indicate a value corresponding to a length of mortgage, income of applicant, state in which the loan is being sought, gender of the applicant and the like. For example, A may indicate a numerical value corresponding to a particular length of mortgage, B may indicate a numerical value corresponding to an income band, and so on. According to exemplary aspects, certain data points may include more attributes or features than others. For example, for a credit application of an existing consumer, more information may be available based on existing history between the consumer and its corresponding organization, thus, more attribute or feature information may be available. In contrast, for a credit application of a new consumer, little information may be available outside of what was requested from the requesting consumer as no history exists between the new consumer and the organization. For unavailable attribute information, a value of 999 or other applicable values. In another scenarios, a credit application of a very wealthy consumer (e.g., a lottery winner) may have special values that may be unique to the respective individual or otherwise rare in other consumers or applicants.

Further, the one or more clustering stopping criteria may include, without limitation, K-means clustering using the elbow method. However, aspects of the disclosure are not limited thereto, such that the one or more clustering stopping criteria may include other stopping criteria, such as a minimum correlation limit. According to exemplary aspects, attributes or features and/or the clustering stopping criteria may be utilized to analyzed data and identify potential groups or clusters.

In operation 402, decomposition of acquired features is performed on the raw data obtained in operation 401. According to exemplary aspects, feature decomposition may be directed to identifying common and rare feature values for each features. For example, a simple distribution may be achieved to flag over-represented and under-represented values.

An exemplary process for performing feature decomposition may include identifying each feature included in a data frame or data set, and if data is numerical, then rounding the respective data to a next integer. However, if the data is text, then data may be normalized where each text is mapped to an integer. Also, for each feature in the data frame or data set, distribution of data along a respective feature is computed, and clustering of data may be performed based on the distribution. In an example, clustering of data may be performed using a clustering approach where clusters are computed with respect to the count of data, such as feature value (e.g., A{1}). According to exemplary aspects, stopping criteria may be utilized as a clustering stopping criteria.

Figure 5:
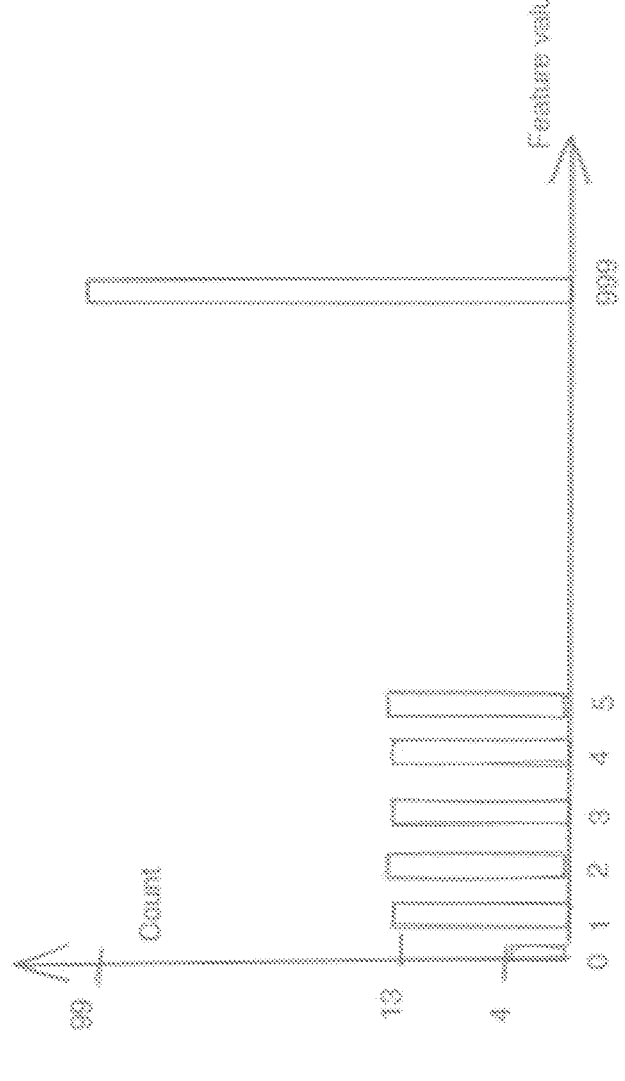
FIG. 5 illustrates a generated distribution graph for performing features decomposition in accordance with an exemplary embodiment.

For example, FIG. 5 exemplarily illustrates a sample distribution analysis for separating out features and flagging over-and-under represented feature values.

As illustrated in FIG. 5, a particular number of cluster or feature cores (K) may be specified. In an example, the number of cluster cores may be manually inputted or automatically determined by one or more machine learning (ML) or artificial intelligence (AI) models. However, aspects of the present disclosure are not limited thereto, such that other predictive or generative models may be used, such as neural network, decision tree, ensemble trees and the like.

In an example, AI or ML algorithms may be executed to perform data pattern detection, and to provide an output based on the data pattern detection. More specifically, an output may be provided based on a historical pattern of data such that with more data or more recent data, more accurate outputs may be provided. Accordingly, the ML or AI models may be constantly updated after a predetermined number of runs or iterations. According to exemplary aspects, machine learning may refer to computer algorithms that may improve automatically through use of data Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, N-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment the ML or AI models may be generated using at least one from among an artificial neural network technique, a decision tree technique, a support vector machines technique, a Bayesian network technique, and a genetic algorithms technique.

Based on the specified or determined K value, grouping of feature values may be grouped as a cluster core based on similarity. For example, for feature A, three cluster cores are specified as indicated by the K value. The first cluster core includes values of {1, 2, 3, 4, 5}, the second cluster core includes value of {0}, and the third cluster core includes a value of {999}. As shown in FIG. 5, feature values (X-axis) of 1, 2, 3, 4 and 5 have similar count values (Y-axis), and feature values of {0} and {999} have differing count values.

Although not explicitly illustrated in FIG. 5, feature B may specify 3 cluster cores, the 3 cluster cores including feature values of {1, 2, 3, 4, 5, 6, 7, 8, 9},{10000}, and {1000}, respectively, of feature B. Similarly, feature C may specify 2 cluster cores, the 2cluster cores including feature values of {1, 8} and {6}, respectively, of feature C. Lastly, feature D may specify 2 cluster cores, the 2 cluster cores including feature values of {1, 2, 3, . . . 30} and {31}, respectively, of feature D.

Based on the feature values, distribution graph may be generated with feature values provided along the X-axis and corresponding counts provided along the Y-axis as shown in FIG. 5. As exemplarily seen in FIG. 5, feature value of {0} of feature A may be under-represented, whereas feature value of {999} of feature A may be over-represented.

In operation 403, a correlation threshold is obtained or otherwise determined, and correlation analysis is performed on the decomposed features. According to exemplary aspects, the correlation threshold may be manually specified or inputted or automatically determined based on one or more ML or AI models.

According to exemplary aspects, correlation analysis may be directed to computing correlation among the set of decomposed feature values (e.g., a set of feature values with associated representative group of feature values). Correlation analysis may be include determining associate representative group of feature values included in the data set for each of the features F1, F2 and the like (see e.g., feature A{1, 2, 3, 4, 5}, A{0}, A{999}, B{1, 2, 3, 4, 5, 6, 7, 8, 9}, B{10000}, B{1000}, C{1, 8}, C{6} and the like illustrated in FIG. 6).

Once associated representative group of feature values are determined for each of the features, correlation between the feature cores are computed. For example, correlation between feature cores F1 and F2 is computed. An exemplary correlation analysis is illustrated in FIG. 6.

Figure 6:
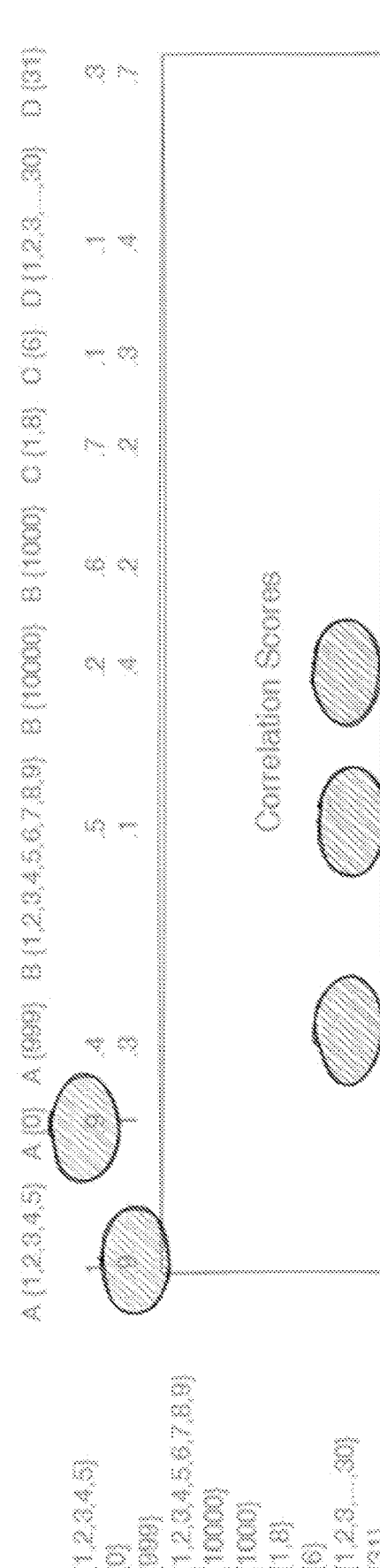
FIG. 6 illustrates correlation scores table in accordance with an exemplary embodiment.

As shown in FIG. 6, each of the feature cores are provided both horizontally and vertically and correlation values are determined for each of the intersections. For example, correlation between feature cores A{1, 2, 3, 4, 5} and A{999} is 0.9. Correlation between feature cores A{0} and A{1, 2, 3, 4, 5} is 0.9. Once correlation values are determined for each pair of feature cores, grouping of sufficiently correlated feature cores may be performed via clustering in operation 404.

More specifically, in operation 404, another clustering stopping criteria is obtained and grouping is performed using the obtained clustering stopping criteria and based on the correlation values computed in operation 403. According to exemplary aspects, operation 404 includes comparing the correlation value of each pair of feature cores as determined in operation 403 against the obtained or determined correlation threshold value. If the correlation score for a pair of feature cores is determined to be larger than or equal to the correlation threshold value, the feature cores included in the pair are grouped together as a cluster. Alternatively, if the correlation score for the pair of feature cores is determined to be smaller than the correlation threshold value, the feature cores included in the respective pair are not grouped together.

Figure 7:
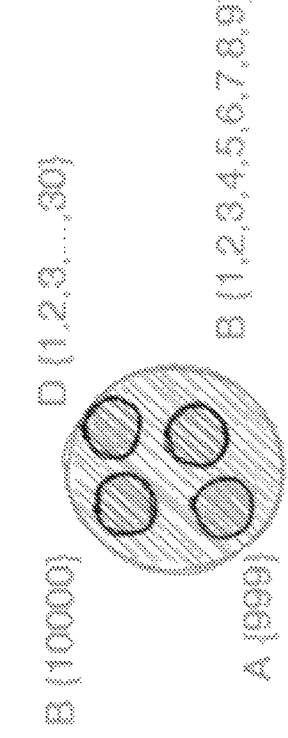
FIG. 7 illustrates grouped cluster cores in accordance with an exemplary embodiment.
Figure 7:
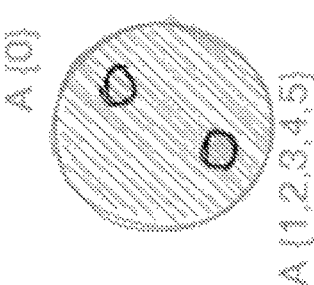

As exemplarily illustrated in FIG. 7, feature cores A{0} and A{1, 2, 3, 4, 5} are grouped together in one cluster, and feature cores B{10000}, A{999}, D{1, 2, 3, . . . , 30} and B{1, 2, 3, 4, 5, 6, 7, 8, 9} are grouped together in another cluster based on the correlation scores of the feature cores.

In operation 405, model training is performed using inputted raw data set. According to exemplary aspects, model being trained may be a ML model, AI model, other predictive or generative model, neural network model, decision tree model, ensemble tree model and the like. The trained may be utilized for rendering inferences for datasets having limited information. Accordingly, even for credit applications having limited information, a decision may be rendered with supporting rationale based on the limited data and inferences determined via the trained model.

In operation 406, data distribution sampling strategy is obtained, and pre-processing may be performed by applying the data distribution sampling strategy on the obtained data. For example, data distribution sampling strategy may include, without limitation, selecting 3 random data points within the raw data set, selecting 3 data points where feature A=0 within the raw data set, selecting first 3 (or 3 consecutive) data points within the raw data set, and the like. As exemplarily illustrated in FIG. 7, data points of $X_1$(A=0, B=1, C=8, D=9), $X_2$(A=0, B=30, C=1, D=2) and $X_3$(A=0, B=3, C=8, D=31) may be selected as a sample data set from the raw data set including $X_1$(A=0, B=1, C=8, D=9), $X_2$(A=0, B=30, C=1, D=2) and $X_3$(A=0, B=3, C=8, D=31) . . . $X_n$(A=7, B=2, C=6, D=5). According to exemplary aspects, data distribution sampling may be performed to obtain representative information based on limited computations for computing efficiency and/or to conserve computing resources.

In operation 407, target data (T) and a number of feature or cluster cores are obtained or specified. In an example, the target data T may be inputted by a user to be tested or challenged. The target data T may refer to a credit application with various attributes, such as T (A=100, B=1000, C=1, D=30). The number of feature or cluster cores for the target data T may be inputted by a user or determined by one or more ML models.

In operation 408, explanation is computed at feature level with respect to generated clustered groups. According to exemplary aspects, feature attribution with respect to its contribution within a group or cluster is computed. In an example, operation 408 may include several sub-operations as exemplarily illustrated in FIG. 9.

Figure 9:
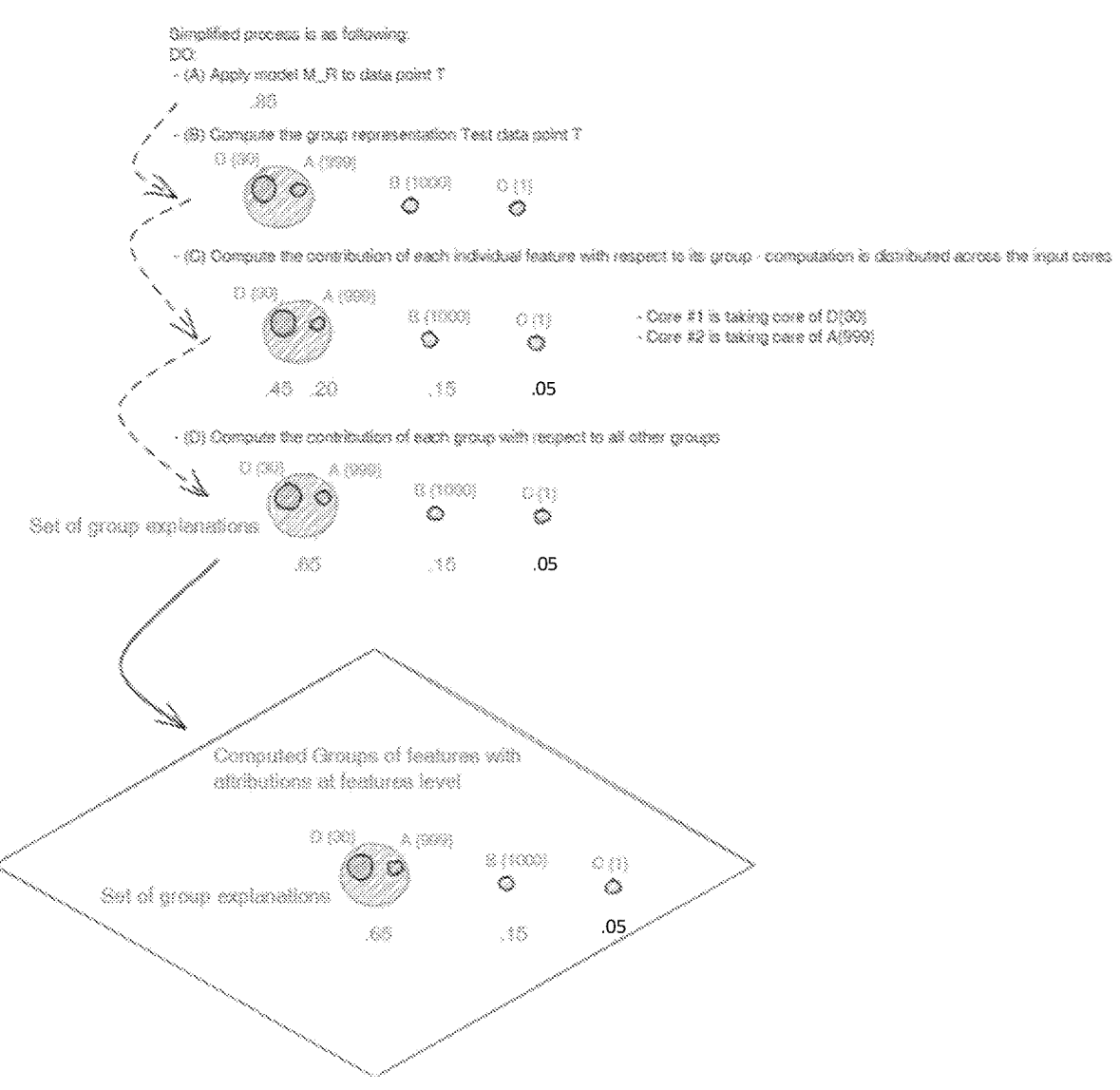
FIG. 9 illustrates a process flow for computing explanations for a result at a cluster level in accordance with an exemplary embodiment.

For example, sub-operation (A) applies the trained model (M_R) to the target data T for obtaining a prediction score for the target data T. In an example, the prediction score may indicate a probability of rejection of a credit application. Sub-operation (B) then computes a group representation test for the target data T. The target data T includes four feature or cluster cores, namely, feature or cluster cores D{30}, A{999}, B{1000} and C{1}, which are then grouped or assigned into three different clusters that were identified previously. However, aspects of the present disclosure are not limited thereto, such that a new cluster core may form a new group or cluster. As illustrated in FIG. 9, the first cluster or group includes the first feature or cluster core of D{30} and the second feature or cluster core of A{999}. The second cluster or group includes the feature or cluster core B{1000}, and the third cluster or group includes the feature or cluster core C{1}.

Sub-operation (C) computes the contribution of each individual feature cores (e.g., feature cores A{999}, B{1000}, C{1} and D{30}) with respect to its group, where computation is distributed across the feature or cluster cores. The feature core of D{30} provides a contribution of 0.45, the feature core of A{999} provides a contribution of 0.20, the feature core of B{1000} provides a contribution of 0.15, and the feature core of C{1} provides a contribution of 0.05. A sum of the contributions add up to the total prediction score of 0.85, which may indicate a 85% probability that the target data T will be rejected.

Sub-operation (D) computes the contribution at a group or cluster level with respect to all other groups or clusters. For example, as illustrated in FIG. 9, the first cluster or group including the feature core D{30} and the feature core A{999} provides a contribution value of 0.65 of total of 0.85 prediction score. The second cluster or group including the feature core B{1000} provides a contribution value of 0.15 of total of 0.85 prediction score. Lastly, the third cluster or group including the feature core C{1} provides a contribution of 0.05 of total of 0.85 prediction score. The three groups or clusters as a total provide a total prediction value of 0.85. For the three groups or clusters, explanations are provided at the group or cluster level, with the largest impact being provided by the first cluster.

Accordingly, at least since explanations may be provided at a group level, accurate explanations may be provided even for input data having limited or unusual information (e.g., feature attributes) according to inferences rendered based on the limited information provided. For example, based on the above noted disclosure, an accurate/rational explanation may be provided for a credit decision in response to a credit application (e.g., input data) having limited, incomplete or unusual information based on group level inferences. Thus, even data inputs that were unable to be conventionally computed by automated operations, potentially causing exception errors, may be processed without such errors to allow for more efficient computing operations.

Further, referring back to the system architecture of FIG. 3, computation of operation 408 may be performed in a distributed manner. For example, N number of feature cores may be divided into N number of tasks, which may be distributed to various computing resources for concurrent or contemporaneous execution for obtaining quicker results. Further, at least since the number of feature cores may be configured to be processed in a distributed manner, computation of feature cores may be easily scalable.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law; the scope of the present disclosure is to be determined by the broadest permissible interpretation of the following claims and their equivalents, and shall not be restricted or limited by the foregoing detailed description.

What is claimed is:

1. A method for generating cluster level explanations for input data having limited or special values, the method comprising:

obtaining, by a processor, an input data set and a clustering stopping criteria, the input data set including a plurality of data points, each of the plurality of data points having a plurality of features, and each of the plurality of features having a plurality of feature values;

performing, by the processor, features decomposition on the input data set;

grouping the plurality of features values, for each of the plurality of features, into a plurality of feature cores based on the features decomposition and the clustering stopping criteria;

obtaining, by the processor, a correlation threshold value;

performing, by the processor, correlation analysis of the feature cores with respect to the correlation threshold value;

grouping the plurality of feature cores into a plurality of clusters;

training, by the processor, a predictive machine learning (ML) model based on the obtained input data set;

obtaining, by the processor, target data to be tested and a number of feature cores for the target data, the target data having a plurality of features and corresponding feature values; and computing, by the processor, explanations for the target data at a feature level for each of the plurality of clusters.

2. The method according to claim 1, wherein the grouping of the plurality of feature cores is performed according to a number of feature cores specified for each of the plurality of features.

3. The method according to claim 1, wherein each of the plurality of clusters includes at least one feature core.

4. The method according to claim 1, further comprising:

obtaining, by the processor, a data distribution sampling strategy; and applying, by the processor, the data distribution sampling strategy on the input data set to remove at least one input data point from the input data set for reducing a computing load.

5. The method according to claim 1, wherein the predictive ML model is at least one of a neural network model, a decision tree model, and ensemble trees model.

6. The method according to claim 1, wherein the computing of the explanations at the feature level for each of the plurality of clusters includes:

applying, by the processor, the trained predicted ML model on the obtained target data for determining a prediction score for the target data;

determining, by the processor, a number of feature cores for the target data;

for the prediction score of the target data, computing contribution of each of the feature cores for the target data, wherein each of the feature cores for the target data contributes a portion to the prediction score of the target data;

grouping the feature cores for the obtained target data into at least two clusters; and computing the explanations at a cluster level for each of the at least two clusters.

7. The method according to claim 1, wherein the performing of the features decomposition on the input data set includes generating a distribution chart for the input data set for the grouping of the plurality of feature values into the plurality of feature cores.

8. The method according to claim 1, wherein the performing of the correlation analysis includes:

calculating a correlation score for each pair of the feature cores.

9. The method according to claim 8, wherein the grouping of the plurality feature cores includes grouping of each of the feature cores by comparing the correlation score against the correlation threshold value.

10. The method according to claim 9, wherein a first feature core is grouped together to form a cluster with a second feature core when a correlation score between the first feature core and the second feature core is higher than or equal the correlation threshold value.

11. The method according to claim 1, wherein the clustering stopping criteria is a K means clustering using an elbow method.

12. The method according to claim 4, wherein the data distribution sampling strategy is selecting a target number of random input data points among the input data set.

13. The method according to claim 4, wherein the data distribution sampling strategy is selecting a target number of input data points having a target feature value for a target feature among the input data set.

14. The method according to claim 4, wherein the data distribution sampling strategy is selecting a target number of consecutive input data points among the input data set.

15. The method according to claim 1, wherein the correlation threshold value is determined by the predictive ML model.

16. The method according to claim 1, wherein a number of the plurality of feature cores is determined by the predicted ML model.

17. The method according to claim 1, wherein a number of the plurality of feature cores is determined based on a number of counts for each of the plurality of feature values.

18. The method according to claim 1, wherein at least one of the plurality of clusters includes at least two feature cores.

19. A system for generating cluster level explanations for an input data having limited or special values, the system comprising:

a memory; and a processor, wherein the system is configured to perform:

obtaining an input data set and a clustering stopping criteria, the input data set including a plurality of data points, each of the plurality of data points having a plurality of features, and each of the plurality of features having a plurality of feature values;

performing features decomposition on the input data set;

grouping the plurality of features values, for each of the plurality of features, into a plurality of feature cores based on the features decomposition and the clustering stopping criteria;

obtaining a correlation threshold value;

performing correlation analysis of the feature cores with respect to the correlation threshold value;

grouping the plurality of feature cores into a plurality of clusters;

training a predictive machine learning (ML) model based on the obtained input data set;

obtaining target data to be tested and a number of feature cores for the target data, the target data having a plurality of features and corresponding feature values; and computing explanations for the target data at a feature level for each of the plurality of clusters.

20. A non-transitory computer readable storage medium that stores a computer program for generating cluster level explanations for an input data having limited or special values, the computer program, when executed by a processor, causing a system to perform a plurality of processes comprising:

obtaining an input data set and a clustering stopping criteria, the input data set including a plurality of data points, each of the plurality of data points having a plurality of features, and each of the plurality of features having a plurality of feature values;

performing features decomposition on the input data set;

grouping the plurality of features values, for each of the plurality of features, into a plurality of feature cores based on the features decomposition and the clustering stopping criteria;

obtaining a correlation threshold value;

performing correlation analysis of the feature cores with respect to the correlation threshold value;

grouping the plurality of feature cores into a plurality of clusters;

training a predictive machine learning (ML) model based on the obtained input data set;

obtaining target data to be tested and a number of feature cores for the target data, the target data having a plurality of features and corresponding feature values; and computing explanations for the target data at a feature level for each of the plurality of clusters.

* * * * *